(No Model.)
A. FAHRNEY.
MECHANICAL MOVEMENT.
No. 290,220. Patented Dec. 18, 1883.
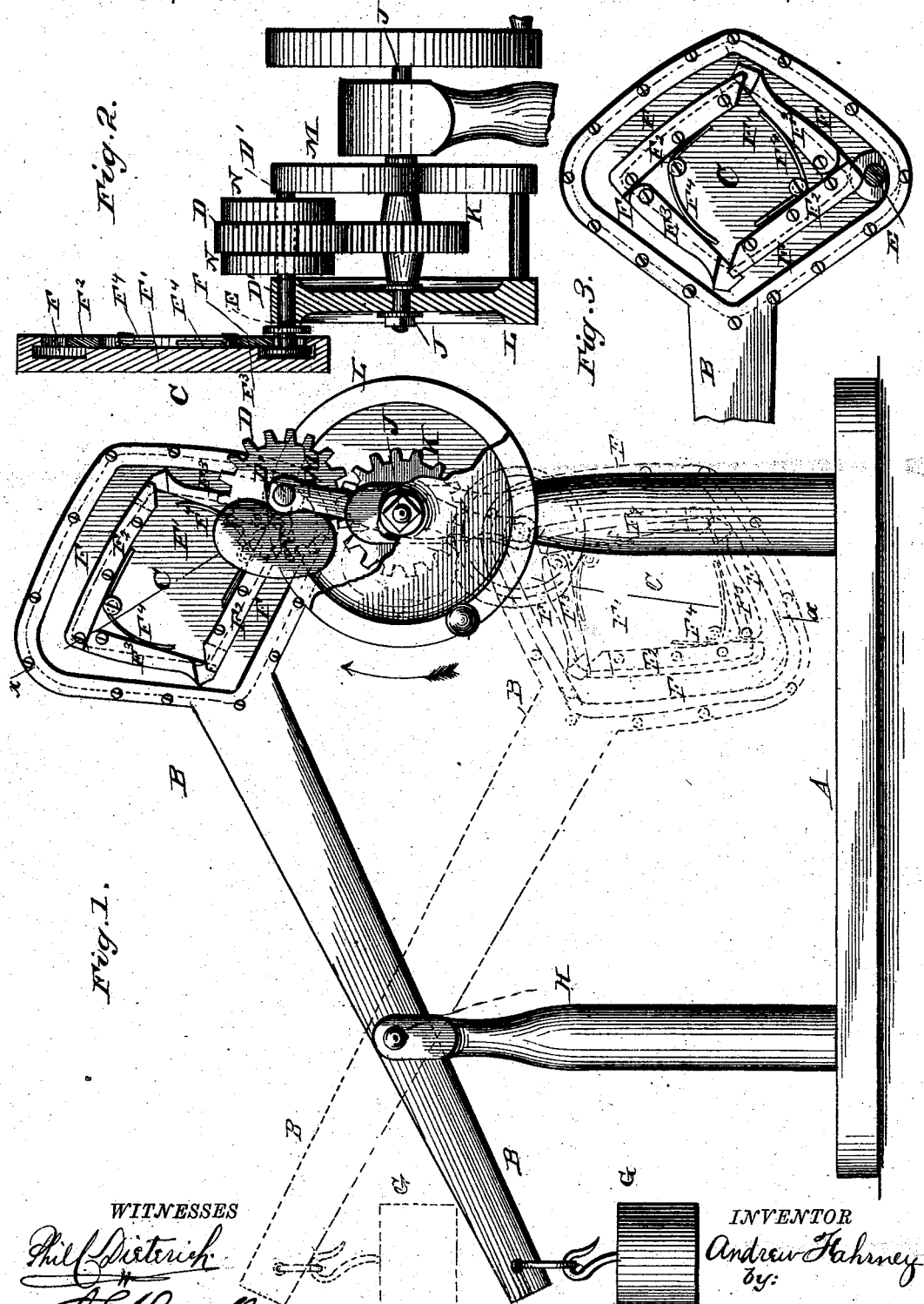

UNITED STATES PATENT OFFICE.

ANDREW FAHRNEY, OF MILLEDGEVILLE, ILLINOIS.

MECHANICAL MOVEMENT.

SPECIFICATION forming part of Letters Patent No. 290,220, dated December 18, 1883.

Application filed October 17, 1883. (No model.)

*To all whom it may concern:*

Be it known that I, ANDREW FAHRNEY, a citizen of the United States, residing at Milledgeville, in the county of Carroll and State of Illinois, have invented certain new and useful Improvements in Mechanical Movements; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention pertains to certain improvements in mechanical movements, and has reference, first, to certain novel mechanism for actuating the power end of a lever beyond the distance traversed by the propelling-power; and, second, the provision of a traveling pinion weighted upon one side to assist the action of the lever in its working direction.

In the drawings, Figure 1 is a side elevation of my invention with the power end of the lever at its greatest altitude, and its lowest point shown in dotted lines. Fig. 2 is a transverse sectional view in the line $x\ x$ of Fig. 1. Fig. 3 is a detached view of the lever-head $b$, showing the path F therein traversed by the projection E.

A is a fixed base, to which the lever B and its actuating mechanism are attached.

G represents the weight to be lifted, or machinery to be operated.

H is the fulcrum of the lever B.

J is a horizontal transverse fixed axle, upon which is rigidly affixed the stationary cog-wheel K, which forms a fulcrum for the wheel D. On the axle J, outside of the cog-wheel K, is pivoted the band-wheel L.

M is a brace, pivoted at its longitudinal center on the axle J, inside of the cog-wheel K, and attached at one end to the inner face of the band-wheel L, near the periphery of the latter, and at its other end furnishing the inner support of the axle D' of the traveling cog-wheel D. The axle D' of the wheel D is journaled at one end in the end of the brace M, and at its other end in the band-wheel L, near the edge of the latter. The wheels D and K have each the same number and same size of cogs in their periphery, which engage each other, and when the band-wheel L and brace M are rotated the revolving wheel D traverses the periphery of the stationary fulcrum-wheel K, the wheel D making one revolution on its own axis during the time it passes entirely around the wheel K. Thus the relative positions of the wheels K and D are at all times maintained.

On the outer face of the band-wheel L, and in the line of prolongation of the axle of the wheel K, is affixed a lateral projection, E, provided with a friction-roller, which projects into and traverses the channel F in the lever-head C in the rotations of the band-wheel L. The lever-head C is suitably attached to the long or power end of the lever B, and is provided on its inner face with the channel or track F, which is rhomboidal in form, having its greatest diameter in a vertical plane, and its upper and lower corners rounded. The channel F is formed of the outside rim or flange, F', the two fixed guides $F^2\ F^2$, respectively parallel with the opposite sides of the flange F', and distant therefrom sufficient to admit of the passage of the projection E. The two spring-guides $F^3\ F^3$, placed opposite to each other in like manner as the guides $F^2\ F^2$, complete the inner wall of the channel F. The spring-guides $F^3\ F^3$ have each one pivoted end and one free end, and by means of the spring $F^4$ the free ends of such spring-guides are thrown into the channel F sufficiently far to prevent the retrograde movement of the projection E. The band-wheel L must be rotated in the direction indicated by the arrows, as when revolved in a contrary direction it will not sufficiently actuate the lever-head C. At the points in the channel F indicated by the free end of the spring-guides $F^3\ F^3$ the disposition of the projection E is to retrace its track, and as such projection passes from the fixed end to the free end of such spring-guides it forces or crowds the latter inward sufficient to permit its passage at the free ends of such guides; but the instant the projection E passes the free end of such spring-guides it releases the latter, and the spring $F^4$ throws the free end of such guide behind the projection E and prevents the return of the latter, and the rotation of the band-wheel L compels the projection E to move forward in the channel F. The length of the channel F is precisely that of the circle described by the projection E in one revolution. When the projection E is at the highest point of its circuit, it is inserted in the lowest point of the channel F, (which latter is placed vertically against the outer face of the wheel L,) and when the projection E is at the lowest point in its circuit it will be found at the upper end of the channel F, Fig. 1, so that the projection E, in traversing one-half of its circuit, moves the lever-head C twice the diameter of such circuit, thereby largely increasing the action of the short end of the lever B without a corresponding increase of the movement of the propelling-power.

The band-wheel L is rotated by a belt from any suitable machinery; or it may be revolved by gearing or by crank, as shown, attached to a revolving axle passed longitudinally through the center of the fixed axle J, to which revolving axle the wheel L is rigidly affixed; or the projections E may be moved in any other suitable and obvious mode.

As the weight end of the lever B may be often applied to mechanism in which such lever works but in one direction—as, for instance, in pumps, where the weight of the piston-rod carries itself down, and power is required to lift only—I have provided the weight N, attached near and extending outside of the periphery of the movable wheel D. The position of said weight N is such that it is outside of the center of motion of the wheel D and moving downward when the weight end of the lever B is being raised. Thus I have not only the gravity of the weight N to assist in raising the pump-piston, but such weight at such time performs the function of a lever through the medium of the wheel D, as shown. When the weight N is being raised, it falls between the axis of the wheel D and the center of motion of the brace M, and is therefore raised at a much less expense of power than such weight exerts in its downward movement, as aforesaid.

In order to yet further increase the efficiency of my invention, I so arrange the position of the projection E in reference to the lever-head C that such roller presses downward at the outer extremity of the channel F, and is therefore at the farthest point from the fulcrum H when the lifting at the weight end of the lever B is being accomplished. The lever-head C can be used in duplicate.

By actual tests on an operating machine I have demonstrated that twenty pounds power on the band-wheel L will exert sixty pounds force on the weight end of the lever B when the distance from such weight end to the fulcrum H is half that from the latter to the center of the lever-head C.

I obtain by my invention not only the convenience of giving the power end of the lever B a longer sweep from a power acting within a much less space, but also a large gain of power over all former applications of a lever known to me. The fixed wheel K performs the function of a fulcrum for the traveling wheel D.

The band-wheel L and lever-head C can be used distinct from the wheels D and K.

What I claim as my invention, and desire to secure by Letters Patent of the United States, is—

1. The lever B, provided with the head C, the latter having the channel F, substantially as shown, and for the purpose described.

2. The lever-head C, provided with the channel F, substantially as shown, and for the purpose specified.

3. The lever B, provided with the head C, and the fulcrum H, in combination with the band-wheel L, provided with the lateral projection E, substantially as shown, and for the purpose mentioned.

4. The combination of the band-wheel L, provided with the projection E, the fulcrum H, the axle J, and lever B, provided with the head C, substantially as shown, and for the purpose described.

5. The combination of the lever B, provided with the head C, the fulcrum H, fulcrum-wheel K, wheel D, and band-wheel L, provided with the projection E, substantially as shown, and for the purpose specified.

6. The lever B, provided with the head C, the fulcrum H, the band-wheel L, provided with the projection E, the fulcrum-wheel K, the wheel D, and the brace M, in combination, substantially as shown, and for the purpose described.

7. The fulcrum-wheel K, the wheel D, furnished with the weight N, the axle J, band-wheel L, having projection E, brace M, lever B, provided with lever-head C, and fulcrum H, in combination, substantially as shown, and for the purpose specified.

8. The fulcrum-wheel K, in combination with the wheel D, the latter being provided with the weight N near its periphery, and fitted to revolve around the former, whereby in part of the orbit of such wheel D the weight N passes down outside of the center of motion of the wheel D, and assists by its gravity in actuating such wheel D, and increases the power exerted thereon, substantially as shown, and for the purpose described.

9. The fixed or fulcrum wheel K, in combination with the traveling wheel D, axle J, and band-wheel L, whereby a double fulcrum is obtained, substantially as shown, and for the purpose named.

10. The lever-head C, provided with the flange F', guides F² F², spring-guides F³ F³, and spring F⁴, substantially as shown, and for the purpose mentioned.

In testimony whereof I affix my signature in presence of two witnesses.

ANDREW FAHRNEY.

Witnesses:
WALTER N. HASKELL,
N. A. VELINE.